Feb. 8, 1966 W. P. EXTON, JR 3,233,341
METHOD OF AND APPARATUS FOR THE DIRECTION
OF THE PLACEMENT OF OBJECTS
Filed Jan. 8, 1962 4 Sheets-Sheet 1
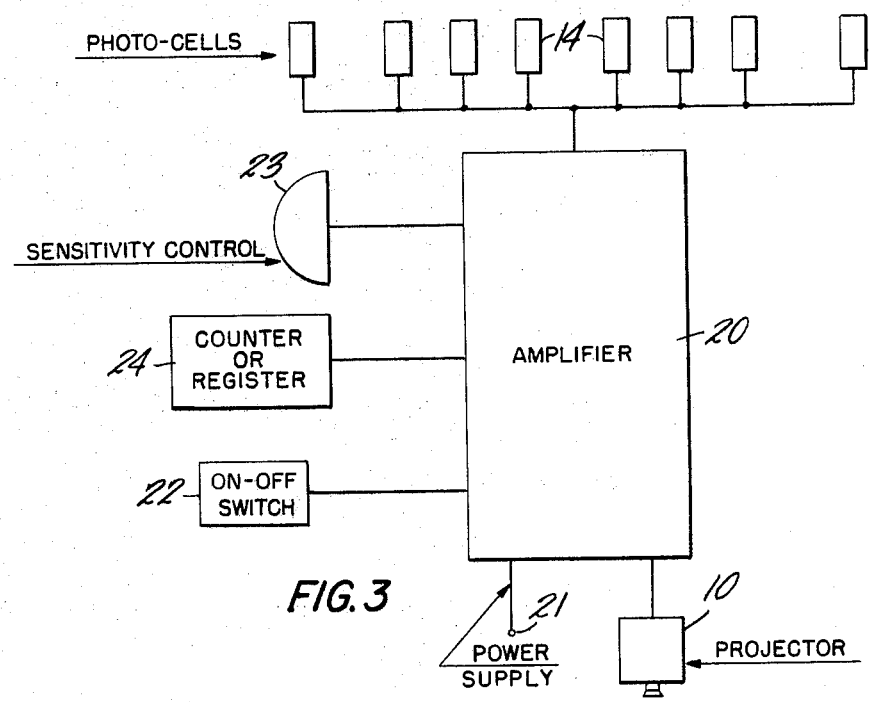
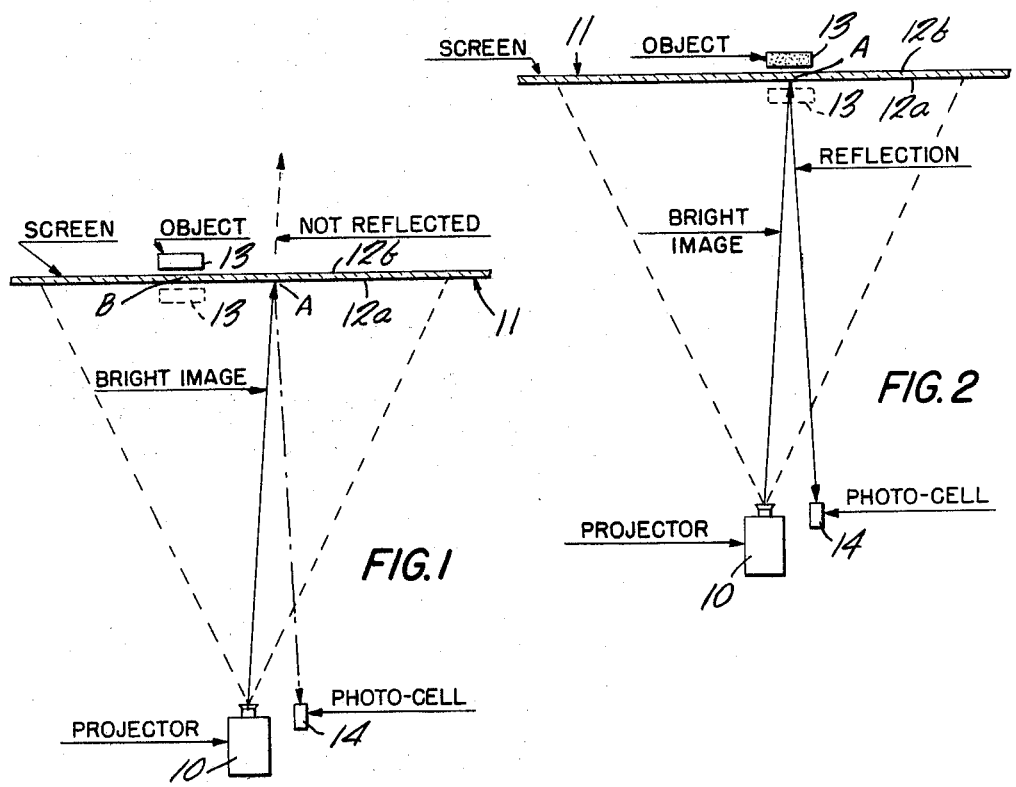

Feb. 8, 1966    W. P. EXTON, JR    3,233,341
METHOD OF AND APPARATUS FOR THE DIRECTION
OF THE PLACEMENT OF OBJECTS
Filed Jan. 8, 1962    4 Sheets-Sheet 3
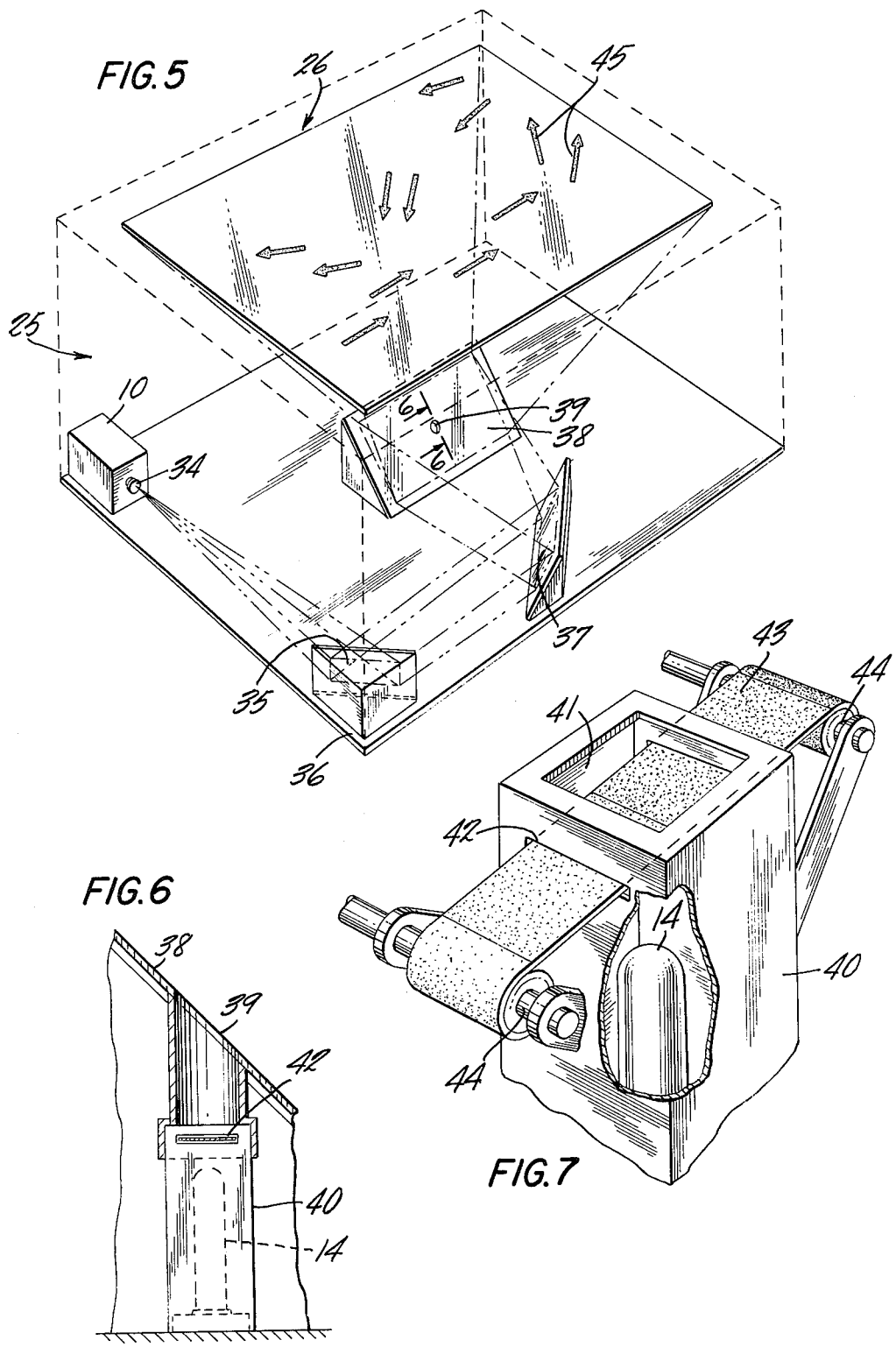

Feb. 8, 1966   W. P. EXTON, JR   3,233,341
METHOD OF AND APPARATUS FOR THE DIRECTION
OF THE PLACEMENT OF OBJECTS
Filed Jan. 8, 1962   4 Sheets-Sheet 4
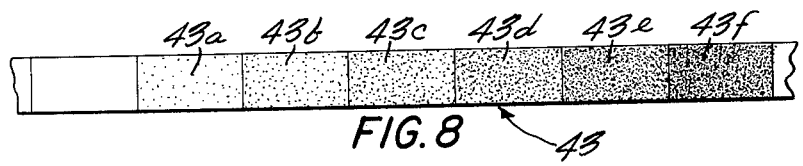
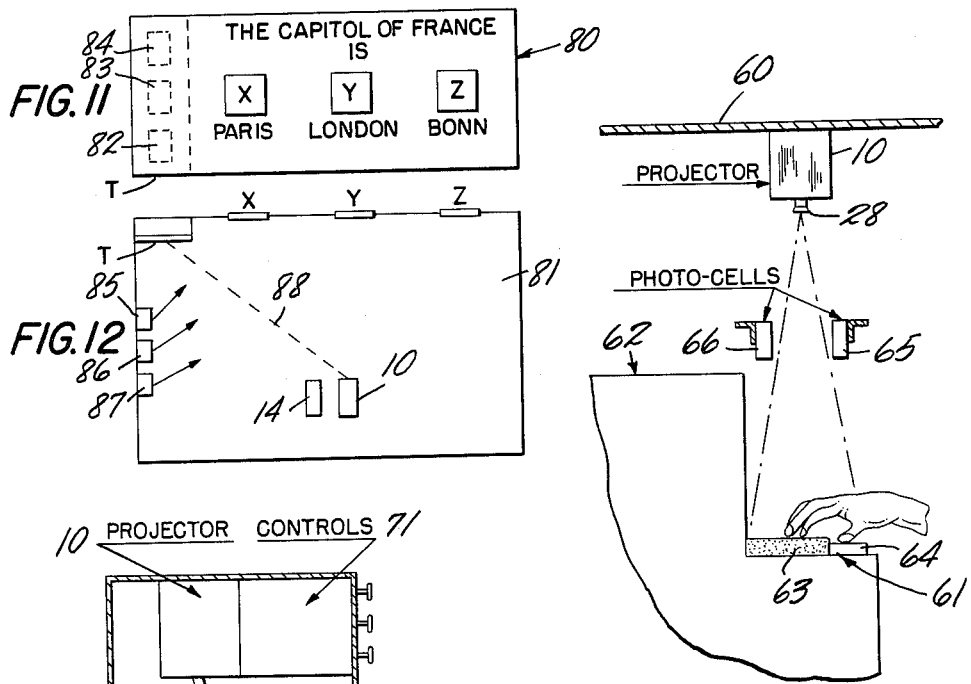
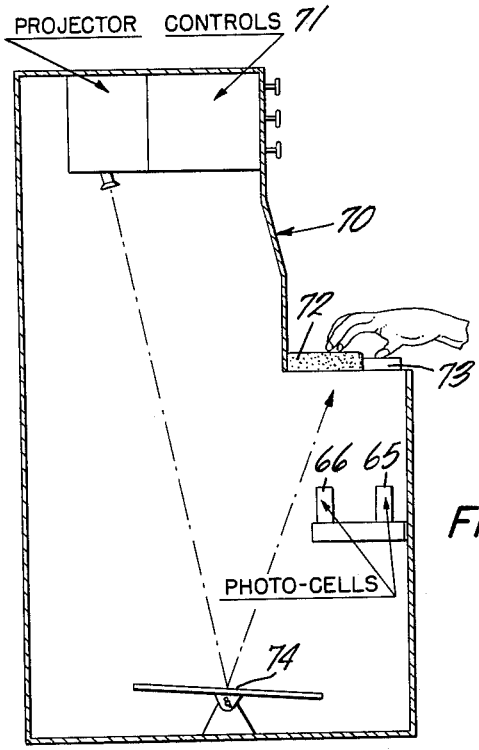

United States Patent Office 3,233,341
Patented Feb. 8, 1966

3,233,341
METHOD OF AND APPARATUS FOR THE DIRECTION OF THE PLACEMENT OF OBJECTS
William P. Exton, Jr., Washington, N.Y.
(R.F.D., Dover Plains, N.Y.)
Filed Jan. 8, 1962, Ser. No. 164,889
11 Claims. (Cl. 35—9)

This invention relates to a method of and an apparatus for the indication or instruction of the proper placement of objects with respect to a surface and to the testing of the accuracy of the same. More particularly, the invention relates to the teaching of body movements such as the sequential positioning of an individual's feet in dancing, the positioning of the fingers for piano playing, or the positioning of various other objects with respect to a workbench, and to a system for indicating, testing or "scoring" the accuracy of such movements. The invention is also directed to a system for teaching testing or scoring responses to symbols, questions, statements, representations or other such stimuli.

Heretofore, many systems have been employed to teach the movement of parts of the body, such as, for example, the teaching of dancing. One such system is described in United States Patent No. 2,605,557 and is based on the projection of visual indicants to a floor in the successive steps of a dance pattern, thereby enabling a student to follow the progressively projected indicants. However, such prior art systems have not provided means to test the accuracy with which the student makes the movements, or their timed relation with music. Frequently, it would be of great assistance to the student and the teacher if the accuracy of the movements could be measured in terms of a numerical or other standard. By translating the ability to perform the required movements to measurable standards, the rate of progress could be easily followed and this could be an important inducement to and reinforcement of the perfection of the skill being learned. Moreover, such a rating system could also be used as a competition or game whereby the relative skills of individuals are scored on a numerical basis in comparison with a predetermined standard of perfection.

Accordingly, it is an object of the invention to provide a method of, and an apparatus for, instructing in and testing the accuracy of the proper placement of objects with respect to a surface.

It is a further object of the invention to provide a method and an apparatus that would indicate an exact sequence of movements of an object and means for checking the accuracy of such movements, or the relation of such movements to a predetermined pattern.

Another object of the invention is to provide an improved method of teaching dancing, piano playing, or other comparable positioning of objects with respect to a surface.

Still another object of the invention is to provide a method and an apparatus for the scoring of the accuracy of the placement of objects with respect to a surface.

Still another object of the invention is to provide a method and an apparatus for presenting questions, statements, symbols, representations or other such stimuli controllably upon a surface, and measuring and recording the responses made thereto by touching or pointing or otherwise placing objects.

The general inventive concept may be illustrated in connection with the teaching of dancing. A projector is employed to project on a surface, serving as a dance floor, a succession of images defining visual signals in the form of lighted areas or patterns or light shapes, in a timed relation with music. The succession of lighted areas on the surface provides visual signals to indicate the successive positions of the dancer's feet in order to perform the necessary steps of a particular dance sequence such as, for example, the waltz, rhumba, tango, etc. When the dancer follows the succession of visual signals, properly and accurately placing his foot at each projected lighted area, each correct foot movement results in a change, caused by the interception of the light by the dancer's foot or shoe, in the normal travel or direction of the projected image. With the foot properly placed, the light is thus deflected or reflected in a different direction. This deflection is employed to actuate a light sensitive device, such as a photocell, which is responsive to a change in direction of the projected light either by reflection or interception. The photocell is electrically connected to an amplifier which actuates a circuit providing an indication when the photocell has been energized. The indication may be in the form of a bell or some other signal, or it may be a counter which registers the number of times, the photocell is energized, or a combination of such indications.

When the dancer makes a misstep, his foot is not placed over the lighted pattern at the projected light shape and the light is therefore not reflected by the dancer's foot or shoe to the photocell. This event does not actuate the photocell, and consequently, the misstep is not indicated on the registering device. In such a system, the registering device provides an indication of the accuracy with which the dance step is performed and it is thus possible to provide a "score" related thereto.

It is obvious that the arrangement could be modified so that the projected light patterns cause the photocell to be actuated only by a misstep. In the latter instance, the registering device provides an indication of the number of errors in following the dance pattern. One of the ways in which this can be done is to "reverse" the projection so that the indication is dark against a lighted background.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

Reference should be had to the accompanying drawings in connection with the description, in which like numerals identify similar parts throughout, and in which drawings:

FIGURE 1 is a cross-sectional view illustrating the principle of non-reflection of a projected image;

FIGURE 2 is a cross-sectional view illustrating the principle of reflection of a projected image to a photocell by a properly placed object;

FIGURE 3 is a block diagram showing the electrical circuit relationships of the apparatus for the actuation of a counter device;

FIGURE 5 is a pictorial representation of another embodiment of the invention showing indirect projection adapted for a dancing application;

FIGURE 6 is a partial cross-sectional view illustrating the housing for the photocell placed beneath a mirrored surface;

FIGURE 7 is a pictorial representation, with a section broken away, of the container for the photocell and illustrating the use of an optical strip filter;

FIGURE 8 illustrates an optical strip filter divided into sections of different degrees of opacity;

FIGURE 9 is an elevation view of an embodiment of the invention showing the projector and photocells mounted etxernally for use in a piano training application;

FIGURE 10 is a cross-sectional view of an embodiment of the invention showing the projector and photocells mounted internally for use in a piano training application;

FIGURE 11 is a plan view of a screen adapted for information testing;

FIGURE 12 is a cross-sectional view of the apparatus as an information testing machine.

Figure 4:
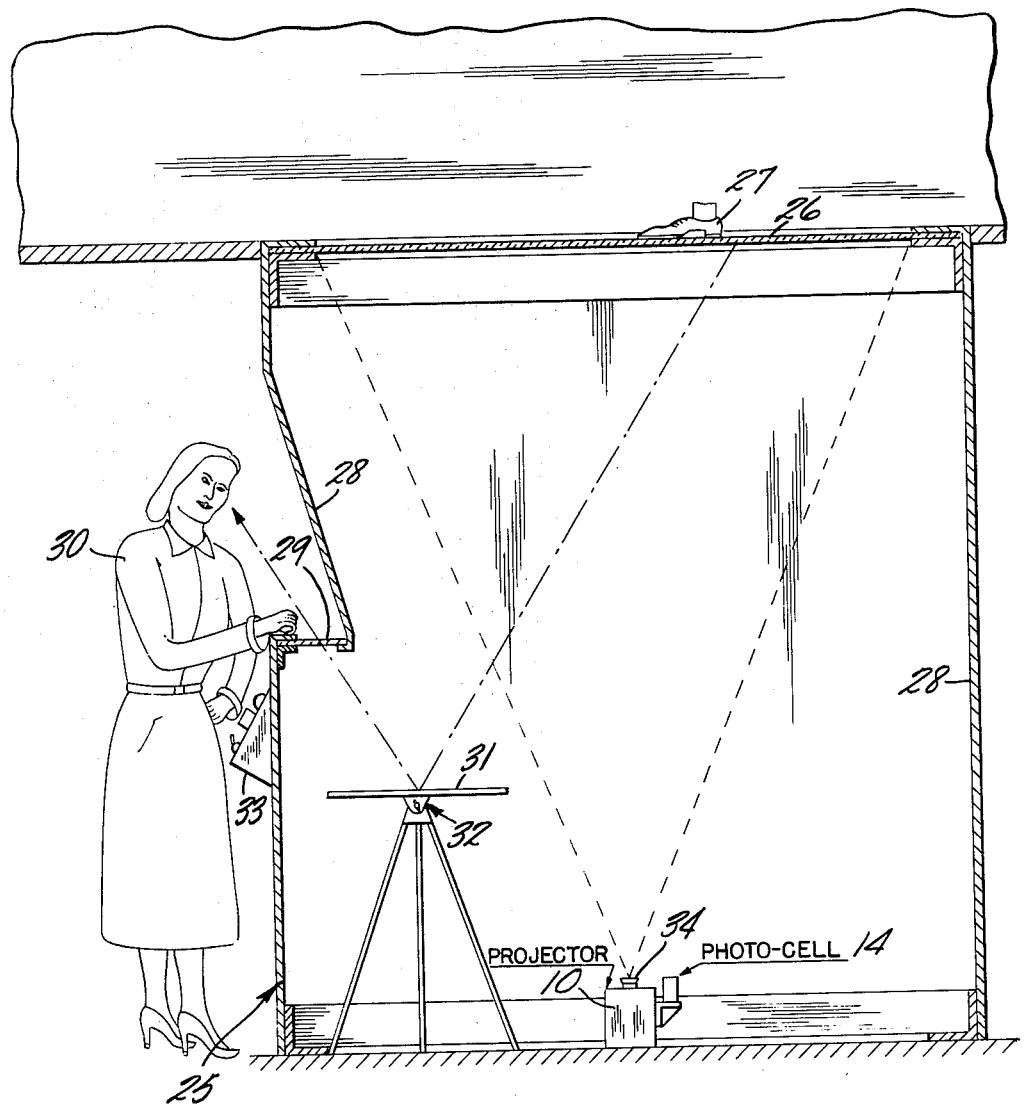
FIGURE 4 is a cross-sectional view of an embodiment of the invention showing direct projection, adapted for a dancing application.

Photocell devices are quite commonly used in "occulting" applications. An occulting application is one in which a continuous beam from a light source causes the photocell to generate a continuous output. Interruption of the beam of light interrupts the output of the photocell. This arrangement may be employed to open doors, count items on a moving belt, etc. An alternative application, referred to as a "flashing" application, reverses the arrangement so that the beam of light reaches the photocell only occasionally, rather than continuously. Each time the beam of light reaches the cell, it is activated, thereby generating a current which can produce a signal or a record of the cell's activation.

In FIGS. 1 and 2, the general principle employed in following the invention is illustrated. A light source, such as a motion picture projector 10, projects an image containing a bright area that appears to move in a light pattern. The bright area is at position A on a panel or screen 11 which may be constructed of any transparent or translucent material. The screen 11 has two surfaces, one surface 12a being on the near side or the same side as the projector 10 and the other surface 12b being on the far side or the side facing away from the projector 10. If an object 13, capable of reflecting light, is located at position B either on surface 12b or on surface 12a (object 13 shown dotted on surface 12a), it will not intercept the brighter part of the beam transmitted to screen 11 and only an insubstantial amount of light will be reflected back from screen 11, the major portion of the light being transmitted through screen 11. A photocell 14, located on the same side of the screen 11 as the projector 10, therefore, will not be actuated. However, if the object 13 is placed on either surface 12b or 12a of the screen 11 at position A thereof, simultaneously with the incidence of the projected image thereon, a substantial quantity of light is reflected to the light sensitive photocell 14, causing it to trigger. Thus, each time an object 13 is placed on the screen at the position where there is a projected bright image, light will be reflected back towards the photocell 14.

Where the object 13 (shown dotted) is on the same side of the screen 11 as the projector 10 and the photocell 14, the system could be arranged to actuate photocell 14 when the object 13 is at position B on surface 12a. If this result is desired, it is merely necessary to provide contrast in reflection by making surface 12a a light reflective surface and object 13 a light absorbing surface (or vice versa). With this construction, the photocell 14 would receive reflected light continuously except when the object 13 is positioned on surface 12a at the point of the projected image or position A.

Another modification of the general principle is the situation where the projector 10 is located on the side of the screen 11 opposite to that on which the photocell 14 is located. For this construction (not shown), the object 13 would interrupt the bright area of the beam of light when located at the point of its projection on the screen 11. The photocell would, therefore, be actuated only when the object 13 is located on the screen 11 at a point other than the point of projection of the luminous indication.

As shown in FIG. 3, the photocell 14 or a plurality of such photocells connected in parallel are connected to an amplifying circuit 20. This circuit 20 has power applied to it from a power supply, through connecting lines 21 and is placed in condition for operation by an on-off switch 22. The projector 10 may also be coupled to the power supply through the amplifying circuit 20 and arranged to commence the projection when on-off switch 22 is placed in the ON position. A sensitivity control 23, which may be a potentiometer, is provided to enable the sensitivity of the triggering of the photocells 14 to be adjusted so that they will trigger only on an increase in light level above a predetermined minimum. The system operates so that the triggering of any one photocell generates a current which is amplified in circuit 20 producing a signal strong enough to actuate a responsive device such as a "counter" or "register" 24 which indicates, records or registers the event of the energization of the photocell. Such "counter" or "register" circuits are generally well known in the art, as are amplifiers and photocells and a further description of these devices or circuits is not deemed necessary.

In FIG. 4, an embodiment of the invention is illustrated adapted for a dancing application. The projector 10 is centrally located in a compartment 25, the upper member of which serves as a floor 26 on which one or more individuals may perform dance steps. The floor 26 is made of a translucent or a transparent material and is, of course, of sufficient structural strength to support the weight of one or more individuals on it. The ambient light level of the interior of compartment 25 can be controlled, since it is essentially a closed compartment. Mounted in the compartment 25 adjacent to the projector 10, is a photosensitive device such as a photocell 14. The projector 10 is arranged so that it can project light images over substantially the entire area of the floor 26. The photocell 14 is shielded from the beam of light projected by the projector 10 but is arranged to have its light sensitive parts facing the floor 26, thereby enabling it to sense any reflections of light from the floor 26 or to sense any increase in the ambient light level within the compartment 25. Photocell 14 is adjusted to trigger on a slight increase in the ambient light within the compartment 25, as may occur when an object, such as a dancer's shoe 27 on floor 26 reflects all or a part of the projected light back into the compartment 25. To increase the amount of reflected light and to assure that the ambient light is sufficiently intensified upon reflection back into compartment 25, the inside wall surfaces 28 of compartment 25 may be coated with a reflective material. In this way, the sensitivity of the photocell 14 may be adjusted so that the slightest increase in the ambient light intensity within the compartment 25 causes the photocell 14 to trigger.

If desired, compartment 25 may be equipped with a small viewing window 29 through which an observer or an operator 30 of the apparatus is able to observe the interior of compartment 25 and more particularly the underside of floor 26. For this purpose, a mirror 31 may be mounted on a stand or bracket 32 and placed in a convenient position within the compartment 25 such that the operator 30, by peering through the window 29, is able to see the underside of the floor 26. In this way, the operator is able to observe the projection of the light shapes to the floor 26 as well as the movements of the dancer's feet in relation to the projected light images as they are projected on the floor 26. The viewing window 29 may also be employed to set up and adjust the apparatus. The control panel 33, containing the amplifying circuit 20, on-off switch 22, sensitivity control 23 and the indicating device such as the counter 24, may all be mounted on the outside wall of compartment 25 near the viewing window 29.

The projector 10 may be equipped with a film which has been adapted to project light areas in a particular sequence on floor 26 in accordance with a predetermined dance pattern. The film also has a sound track, capable of being amplified in the usual way, and renders a musical composition correlated with the particular dance pattern being projected. Consequently, when the projector 10 is operating, dance music is audible and there will be visible on floor 26 a sequence or pattern of light areas in timed relation to the music, which, if followed by a dancer, would result in the dancer's correctly performing or "following" a particular dance step.

In FIG. 4, the projector 10 has been shown as being centered opposite the geometric center of the floor 26 and projecting directly towards that center. While this may be the simplest arrangement, it requires sufficient distance between the lens 34 of the projector 10 and the floor 26 to accommodate both the projector and the required "throw" of the projection.

Assuming that the floor 26 is of a size 60 inches by 45 inches, and assuming that the projector 10 has a lens with a 45 degree angle of projection, the distance from the projector to the floor must be approximately 73 inches. It is apparent that this construction requires considerable vertical space beneath the dance floor 26, which may not always be practical or available.

To decrease the vertical space required, the projector 10 may be mounted off center, and arranged to project its beams, via one or more front silvered mirrors, which are located to reflect the projected beam to the floor 26. Thus, if a 45 degree projection lens is employed, the lens could be 30 inches from a mirror, comprising a first stage of indirect projection, which would be sized to receive the projected image and reflect it to the 60 inches by 45 inches floor located 43 inches from the center of the mirror. For this application, the total "throw" of the projection would be 30 inches plus 43 inches or 73 inches. Thus, one stage of indirect projection would permit a reduction of the overall height of the compartment. In addition, the projector could be located where service of the projector would be more readily facilitated. It will be understood that the position of the projector could be changed, raised or lowered to vary the distance from the lens to the floor to adjust the size of the projected image.

In FIG. 5, there is shown a modification which may be adapted as required, and which is effective in reducing the necessary vertical height beneath the floor 26.

The projector 10 is placed in one corner of the compartment 25 and arranged so that its lens 34 projects towards a mirrored surface 35 located in an adjacent corner 36 of the compartment 25. The mirrored surface 35 is placed at an angle so that it reflects the projections thereon to another mirrored surface 37 which may be conveniently located in the compartment 25. Mirrored surface 37 is also placed at an angle such that it will again reflect the projections to mirrored surface 38 which is located in approximately the center of compartment 25 and so arranged that it will reflect the projected image to the translucent floor 26. Thus, by increasing the number of mirrors and the reflections (i.e. the number of stages) the length of projection may be made as long as required without an undue sacrifice of compartment height. In the illustration of FIG. 5, each mirrored surface represents a stage of projection and, as is apparent, there are shown three stages of indirect projection.

The number of stages of indirect projection and the physical relationship of the mirrors with respect to each other and to the projector and the floor, may be readily determined by well known principles of design in accordance with requirements of any particular application. For example, if two stages of projection were employed, projector 10 could be placed in corner 36 and arranged to project towards the mirrored surface 37. Assuming that the angle of projection from the lens of the projector 10 is 30 degrees, the front-silvered mirror 37 is 40 inches by 30 inches. Front-silvered mirror 38 is 50 inches by approximately 37½ inches and tilted at a 45 degree angle from the vertical to reflect the image upward toward floor 26. The distance between the projector lens 34 and the center of front silvered mirror 37 is 21 inches. The distance between the front silvered mirror 37 and the center of the front silvered mirror 38 is another 21 inches. Thus, by employing two stages of indirect projection, the over-all vertical height of the compartment may be reduced approximately 42 inches from that height which would be required if a direct projection method were employed.

For direct projection, as illustrated in FIG. 4, photocell 14 may be placed adjacent to the projector 10. For indirect projection, as illustrated in FIG. 5, in the center of front silvered mirror 38 an aperture 39 may be provided, below which may be located the photo-sensitive cell 14. In either embodiment, the photocell 14 is in an appropriate shielded container 40, shown in FIGS. 6 and 7, and has an opening 41 at one end thereof to permit light to enter the container and to impinge on the photo-sensitive element of cell 14. The photocell 14 is arranged so that light greater than a predetermined intensity entering through opening 41 causes the photocell 14 to trigger. As an added convenience for adjusting the sensitivity of photocell 14, the container 40 preferably is equipped with slots 42 through which glass filters or an optical strip filter 43 may be fitted. The optical strip filter 43 is shown in FIG. 8 and is composed of several filter sections 43a–43f of different degrees of opacity. The optical strip filter 43 may therefore be adjusted so that the filter section with the desired degree of opacity is placed across the opening 41 of the container 40, thereby filtering the light impinging on the light sensitive portion of the photo-cell 14. If desired, the optical strip filter 43 may be wound on rollers 44 located on opposite sides of the container 40 and adjusted to allow the strip filter 43 to move freely through slots 42. Rollers 44 may be conveniently connected to a motor or an extended handle (not shown) located outside compartment 25 to enable the adjustment of the filter 43 so that the required degree of opacity extends across the opening 41. In this way, the optical system may be adjusted and balanced to provide for the triggering of the photocell 14 upon a predetermined change in light intensity in the compartment 25.

In operation, the optical strip filter 43 is first adjusted by rotating rollers 44 such that a section of the strip filter 43 extends across the opening 41 in container 40. The particular section of the filter 43 which is selected, is one which provides the correct level of light intensity for the triggering of photocell 14 if an object is placed on the floor 26 over a projected light image at the instant of projection. The projector 10 is then started by closing an on-off switch 22, which may be a coin operated switch if the apparatus is designed for commercial purposes as a game, for instance. If indirect projection is employed, as illustrated in FIG. 5, the lens 34 of projector 10 projects the sequence of light images to a mirrored surface 35 which reflects the images to another mirrored surface 37, which reflects the images to a third mirrored surface 38, which causes the images to appear as a light shape 45 on the surface of floor 26. The dancer, on floor 26, is able to observe the light shapes 45, and, if the apparatus is being used for teaching purposes, the student dancer begins to follow the projected light shapes 45 as they appear in sequence on the surface of floor 26. When the dancer places his foot over the light spot 45 simultaneously with its projection on the floor 26, the light impinging on floor 26 is caused to be reflected back into compartment 25 by the dancer's shoe, thereby increasing the ambient light within the compartment. If desired, the dancer may be equipped with special shoes having reflective soles to assist the reflection of the light. The momentary increase in the ambient light intensity caused by the reflected light is "visible" to the photocell 14 through the optical strip filter 43, opening 41 in container 40 and aperture 39 in mirrored surface 38, thereby causing the photocell 14 to trigger and generate an electrical signal. The photocell 14 is connected to an amplifier 20 which amplifies the signal and actuates a counter or register circuit 24. Each time that the dancer correctly places his foot over a projected light image on floor 26, the register circuit 24 provides an indication of this event.

If the student fails to place his shoe properly on the light shape 45 as it is projected on the floor 26, the light will be transmitted through the translucent floor 26 and the ambient light intensity within the compartment 25 will therefore be unchanged. Consequently, the photocell 14 will not trigger at this instant and the counter or register circuit 24 will not be actuated. Upon the completion of the particular dance number, there will be indicated on the counter or register circuit 24 the number of times that the student correctly followed the dance step as it was projected on the floor 26. This figure could be compared with a perfect score, thereby indicating the number of missteps made by the student. Thus, the proficiency of the dancer can be measured accurately and compared with a numerical standard of perfection. It is apparent that apparatus of this nature may be employed as a game for commercial purposes in which the dancers are players competing with one another or where the individual dancer attempts to achieve a high "score."

Where it is desired, or if it is necessary to increase the capability to sense small changes in the ambient light within the compartment 25, a plurality of photocells may be employed, conveniently spaced throughout the compartment 25. Each one of the photocells 14 could then be located to be responsive to reflections from a particular area of the floor 26. The photocells 14 would be connected to the amplifying circuit in parallel so that the sensing of an increase of light intensity by any photocell sufficient to trigger that photocell, would be amplified by the amplifying circuit 20 and cause the counter and register circuit 24 to be actuated. The circuit for the connection of the photocells 14 to the amplifying circuit 20, and its connections to the counter and register circuit 24 and the on-off switch 22 are commonly known circuits and need not be described further here.

The apparatus may provide for the selection of any one of a group of available dance steps for projection. By employing the principles of indirect projection, two or more projectors can be provided conveniently within the compartment in different locations therein. Each projector is equipped with film having a sound track and a particular sequence of images thereon for a particular dance step. If the device is being used as a game, appropriate controls are incorporated so that the player first selects the type of dance he wishes to perform and then actuates a particular projector by the functioning of the coin operated switch. The mirrored surface 37 may be mounted on a rotatable pivot (not shown) thereby enabling it to be adjusted to position the mirrored surface for receiving the image from the selected projector which is mounted in a different corner of compartment 25. This arrangement provides ready availability of a number of different dance patterns. In addition, there are available other means, commonly known, for providing selectivity among a number of films or tapes.

The screen or floor 26 may be made of ground glass or an equivalent, such as tempered glass with a translucent coating; or it may be of suitable plastic or laminated materials wihch have transparent or translucent characteristics.

In FIGS. 9 and 10, there is illustrated another embodiment of the invention as a piano or organ trainer. In FIG. 9, the projector 10 is shown mounted on and supported by an overhanging structure 60 located above the keyboard 61 of a conventional piano 62. The lens 34 of the projector 10 is positioned to project light images on the keyboard 61 and is spaced sufficiently therefrom so that the projected light may impinge on any one or more keys over the entire length of the keyboard 61. It is understood that in practice it may be desirable to use two or more synchronized projectors to cover the length of the keyboard. Moreover, the principles of indirect projection suitably adapted may be applicable here.

Although the piano 62 is of generally conventional construction, the keys thereof act as the screen in the invention and, as such, may be required to be of a special material having reflective or light transmitting characteristics depending on the particular design embodying the invention. In FIG. 9, the black keys 63 and the white keys 64 of the piano keyboard 61 have their top surfaces covered, coated or made of a specially mirrored surface to reflect light impinging thereon. A group of photocells 65 located above the keyboard 61 and longitudinally therealong are provided to be responsive to any light from the projector 10 which is reflected by the white keys 64. Another group of photocells 66, similarly located, are provided to be responsive to any light from the projector 10 which is reflected by the black keys 63.

In operation, the projector 10 has film therein which provides for the projection of beams of light towards the keys in a predetermined pattern and sequence in accordance with a particular piece of music. If the keys on which the light beams fall are depressed in the pattern and sequence prescribed by the projections, the result is the playing of a particular piece of music. Projected light which is reflected back from the white keys 64 is sensed by one or more photocells in the group of photocells 65 causing the sensing cells to trigger. The parallel set of photocells 66 are adjusted so that one or more cells trigger when the projected light is reflected back from the black keys 63. Both sets of cells are connected in parallel to the amplifier circuit as has been previously described, and arranged to actuate a counter and registering device for scoring purposes. When the apparatus is started, the pupil begins to play the piece of music for which the film in the projector has been prepared. When the pupil's fingers are placed on the correct keys at the correct time, the light coming from the projector 10 will be intercepted by the pupil's fingers. Therefore, less light will be reflected to the photocells. Thus, when the fingers are properly placed, the photocells will not trigger and there will be no indication registered on the scoring apparatus 24. If the pupil's fingers are not on the correct keys when the projected beams of light strike the keys, the light will be reflected by the mirror surface of the keys to the photocells causing them to trigger, thereby registering on the scoring apparatus 24 the event signifying the improper placement of the fingers. In this way, an indication is given of the number of mistakes which the pupil makes in connection with the playing of any particular piece of music. If desired, errors can be recorded in connection with a time scale so that the exact moment of the error may be noted, and the error precisely identified.

FIG. 10 illustrates still another embodiment of the piano trainer apparatus. In this embodiment, a specially constructed piano 70 is provided and contains within its enclosure the projector 10, the groups of photocells 65 and 66 and the electrical equipment and controls 71. The black keys 72 and the white keys 73 of the piano 70 form the projection "screen" and are made of any suitable translucent material. The projector 10 may be located in the top upright portion of the piano 70 and arranged to project the beams of light toward a mirrored surface 74, located near the bottom of the piano. The mirrored surface 74 is tilted at an appropriate angle so that the light is reflected up towards the under surface of the keys. The groups of photocells 65 and 66 are arranged so that one or more may receive any light which is reflected back from the keys 73 and 72 respectively, thereby causing the photocell to trigger. The sensitivity of the cells is adjusted so that when the fingers of a student are properly placed over the keys simultaneously with the projection of light thereon, the fingers cause enough light to be reflected back to the photocells 65 and/or 66, located within the piano compartment such that one or more photocells are caused to trigger. The signal produced from the photocells is amplified and, as heretofore described, actuates a counter or register circuit, thereby indicating the number of times that the fingers have been properly positioned on the keys. This figure can be compared with a predetermined perfect score for any particular musical piece.

If desired, the negative of the film may be used for projection so that the fingers appear as dark areas while all other areas are bright. In the latter application, a falsely struck key reflects back enough light to trigger a cell. In such an embodiment, only the errors are recorded. Any of the above apparatus could be adapted to sound a warning or stop the film when an error is made.

Film with the proper patterns of light and dark areas or, if desired, patterns of color, may be provided for use in a projector by any suitable means. For example, to produce the film for the dancing application heretofore described, special shoes having soles made of a transparent, light transmitting material such as "Plexiglas" may be provided to a professional dancer. A source of light, preferably battery operated, is attached to the shoes and is arranged to be energized and to illuminate the soles of the shoes when they make contact with the floor. Wearing these shoes, the professional dancer proceeds to perform a particular dance pattern on the translucent or transparent floor 26 in the time with music. For each step that the dancer takes, the sole of the shoe is illuminated upon contact with floor. Simultaneously, a motion picture or television camera is located beneath the dance floor 26 and takes motion pictures of the entire floor thereby recording the professional dancer's performance. The music itself to which the performance is timed is also recorded on the sound track of the film in the usual way. Therefore, a foot on the surface of the floor 26 will be indicated on the film, after it has been developed, by an area of light where the sole of the shoe had been. If desired, the right foot may be differentiated from the left foot by employing different light shapes or different colors of light.

In a similar manner, the desired film may be provided by a motion picture camera employed in place of the projector in the piano trainer application described in connection with FIG. 9. The mirror surfaced keyboard is suitably illuminated from above and a motion picture is taken of the playing of a piece of music by a competent pianist. The camera records the images of the expert's fingers on the keys, synchronized with the music. The keys reflect light better than the player's fingers, which will appear dark against light. Thereafter, the negative of the developed film is employed to project light images upon the piano keyboard. The projected images of the pianist's fingers will now appear as high levels of illumination upon the appropriate keys in the desired sequence to reproduce accurately the correct positioning of the fingers in order to play the piece of music accurately.

The filing of an expert's playing of a piece of music, as heretofore described, may also be suitably adjusted for accurate reproduction of the original pattern for use in the embodiment of the invention shown in FIG. 10.

In any of the above applications, a television camera may be employed to produce a kinescope for subsequent use in suitable projectors or to transmit simultaneous patterns to other surfaces, for coincidental guidance of other performers, students, palyers, etc.

The principles of the invention disclosed herein may also be adapted as a "teaching" or "testing" machine for non-physical subjects. For example, in such an application, questions with a choice of answers only one of which is right, may be projected to one side of a screen. The individual indicates his particular choice by placing his hand or other object on the opposite surface of the screen, at the appropriate place. In a manner similar to that heretofore described, the mechanism evaluates whether the selection is right or wrong.

An apparatus of this kind is illustrated in connection with FIGURES 11 and 12. The projector 10 may project a question in addition to an invisible ray of energy to the selected area of the light and invisible ray transmitting screen 80 where the correct choice is located. This may be done by simultaneous coordinated projection of correlated film, tape, slides, or other suitable materials from synchronized projectors emitting different forms of rays—one visible, for example, light and the other invisible, for example, infra-red or ultra-violet rays. In FIGURES 11 and 12, a plurality of bright areas X, Y and Z are indicated. The correct choice and the selected one to which the invisible ray is directed is in the space marked X. If, for example, infra-red rays were to be projected to X only, no distinction between any of the choices would be apparent to the trainee or individual taking the test. Placing a hand over either space Y or Z, causes no reflection. However, placing a hand over the space marked X would reflect sufficient energy back to photocell 14, to trigger the infra-red sensitive photocell circuit.

Instead of simultaneous projection employing synchronized projectors, the system may be adapted so that the visible projection triggers automatically the proper invisible projection. In such an embodiment, shown in FIGS. 11 and 12, the screen 80 is provided with an opaque portion T within the compartment 81 at which is located photocells 82, 83 and 84, each of which has its light sensitive surface facing towards projector 10. To a viewer or trainee, outside compartment 81, the underside of section T of screen 80 is not visible and therefore any light impinging on any area of section T is shielded from the viewer. Mounted in compartment 81 are sources of invisible rays 85, 86 and 87 associated with and connected to the photocells 82, 83 and 84 respectively. The connections (not shown) are arranged so that when a photocell is energized by light impinging on it, the associated invisible ray source is also energized.

The apparatus operates in the following manner. Simultaneously with the projection of the question and choice of answers to the screen 80, there is projected another beam of light 88 to the area T, said beam of light being directed to one of the photocells 82, 83 or 84, hidden from the trainee's view. The direction of the beam is controlled by the same means for example film, that determines the visible projected image. Photocells 82, 83 and 84 are each associated with areas X, Y and Z respectively, so that when the correct choice is X, the beam of light 88 is directed to impinge on photocell 82. Similarly, if the correct choice is Y, photocell 83 is energized, and if the correct choice is Z, photocell 84 is energized. Thus, the hidden beam of light 88 triggers a photocell that controls a circuit to energize the invisible ray source. Invisible ray source 85 is adjusted to cast a fixed beam of invisible rays toward area X. Invisible ray source 86 casts a fixed beam toward area Y and source 87 casts a beam towards area Z. Cell 14 is a device which is sensitive to the selected invisible rays, so that when an object is placed over the appropriate area simultaneously with the projection thereon of an invisible ray, part of the ray is reflected to the ray sensitive cell 14 and responsive means, heretofore described, indicate that a correct choice has been made.

Thus, for example, a beam of light 88 projected simultaneously with the visible projections of problem alternatives X, Y and Z, strikes photocell 82, since that is the cell associated with the correct answer X of FIGS. 11 and 12. The triggering of photocell 82 energizes a source 85 of invisible rays, for example, infra-red rays, which are directed to area X on screen 80. If the trainee makes the correct selection X, by placing an object thereover, enough infra-red rays will be reflected to trigger infra-red sensitive cell 14 thereby indicating a correct response. A wrong selection reflects no infra-red rays thereby preventing the indication of a correct response.

Another means of accomplishing the same object employing only visible emanations is to arrange for the sequential projection of a bright image first to the area marked X, then to the area marked Y and then to the area marked Z. No distinction is visible to the individual between any of these projections. However, simultaneously with the projection of the bright image to the correct area, an auxiliary bright image projection is cast upon the area T, not visible to the individual. At area T, on the under surface of the screen 80, a reflector 89 is located, the reflector being concealed from the view of the individual taking the test. The sensitivity of the cell 14 is adjusted so that a reflection from the reflector 89 at area T or from any one of the areas over which the individual may place the object, is insufficient to trigger the photocell 14. Thus, when the projector casts light into the space marked Z, it does not cast light on reflector 89. An individual indicating the choice Z, when that area is illuminated, would not reflect sufficient light to the cell 14 to trigger the circuit. However, if the individual makes the correct choice by placing an object over the area marked X at the time that area is illuminated, the photocell 14 will be triggered since the cumulative effect of the reflections from the reflector 89 and from the bright area X will be sufficient to trigger the photocell 14.

With any of these or similar arrangements, the triggered responses can be recorded, as on a strip, sheet, disc or tape, and synchronized with the film or tape being projected. If desired, the apparatus may be provided with visible or audible responsive means to indicate, simultaneously with the selection, whether the choice is the right or wrong answer and these can be counted, visibly scored against a standard, or otherwise presented.

Employing the principles of the invention, any particular design may be selected which is appropriate to the desired use. Although the surface or screen has generally been shown to be horizontal, it is apparent that it could be in any convenient position depending on the application. The object employed to deflect the light may be any part of the body or any other article. The indications provided on the registering circuit may include the following: indicating an "event" such as the reflection of projected light; indicating a "non-event" such as the non-reflection of projected light; registering and recording and counting each "event" or "non-event"; timing and recording time of each individual "event" or "non-event"; otherwise relating each "event" or "non-event" to its place in the original sequence.

Although the embodiments of the invention have been illustrated throughout as employing light and light sensitive devices for the projection and reception of the images, it is apparent that the invention may be practiced using other forms of energizing rays capable of being projected and capable of being sensed by ray sensitive devices. Thus, where the term "image" or "ray" is used, I mean it in the broad sense as that resulting from any kind of energy capable of being focused, either visible or invisible, such as light, ultraviolet rays, infra-red rays, X-rays, heat, ultrasonic or sonic beams, particle emanations of radiation (i.e., electrons, neutrons, etc.), etc. For example, apparatus could easily be provided employing infra-red rays in place of light beams described herein. In addition, ultraviolet light could be employed and the translucent surface could be treated with suitable materials for reacting with luminosity to such emissions.

The principles disclosed in the description of the invention may be readily adapted for use in connection with the instruction of the proper placement of any object with respect to a surface and for testing the accuracy of same. Thus, the invention may be employed in a work bench application to teach movements, the positioning of hands, the placement of tools, work, objects, for training in assembly, manipulation and production operations. The invention could also be employed to teach proper footwork, as in bowling, making tennis strokes, jumping, vaulting, or in teaching fingering of the violin, guitar, banjo, etc. It can also be used to evaluate such activities as swimming strokes, to foster better walking by victims of polio or other afflictions and in connection with many forms of physical therapy.

The invention can also be used, "non-physically," to provide stimuli of any kind and to measure reaction. Thus, the projected image can present two or more symbols, labels, letters, words, pictures, etc., on the surface. The individual reacts with a touch indicating preference, selection, rank order, or the like; and this reaction is evaluated through the photocell and related circuits in terms of the predetermined pattern. The invention thus becomes a "teaching machine" or a "testing machine."

It will thus be seen that the objects set forth above, among those made apparent from the preceding description, are efficiently attained and, since certain changes may be made in carrying out the above method and in the apparatus set forth without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. Apparatus for instructing and testing the proper placement of objects with respect to a surface in accordance with a predetermined standard, comprising,
   (a) a surface having ray transmitting characteristics,
   (b) projecting means for projecting beams of energizing rays toward said surface on predetermined areas thereof in a prearranged sequence to delineate on said surface progressively a succession of patterns of energizing rays,
   (c) ray sensitive means responsive to changes in the direction of the projected beams of rays caused by deflections of said rays each time an object is placed on the surface in accordance with a predetermined standard whereby said rays are intercepted by said object, and
   (d) indicating means electrically connected to the ray sensitive means registering the occurrence of said responsive actuation of said ray sensitive means.

2. The apparatus as defined in claim 1 in which the surface has light transmitting characteristics, the projecting means is a light projector and the ray sensitive means is light sensitive means.

3. Apparatus for instructing in and testing the accuracy of the proper placement of objects on surfaces, comprising,
   (a) a surface having light transmitting characteristics,
   (b) projcting means for projecting light beams toward predetermined areas on the surface in a prearranged sequence to delineate on said surface progressively a succession of patterns of bright areas,
   (c) a compartment located beneath the surface having maintained therein an ambient light threshold,
   (d) light sensitive means in the compartment adapted to be responsively actuated to a change in the ambient light threshold of the compartment caused each time an object is accurately placed on the surface simultaneously with the light beam projection, and
   (e) indicating means electrically connected to the light sensitive means registering the accurate placement of objects on the surface.

4. Apparatus for instructing in and testing the accuracy of the proper placement of objects on surfaces, comprising,
   (a) a surface having a near side and a far side and being of light transmitting material,
   (b) a compartment located on the near side of the surface having maintained therein an ambient light level,
   (c) a projector in the compartment for projecting light beams in predetermined areas in a prearranged sequence on the underside of the surface, (d) light sensitive means in the compartment responsive to an increase in the ambient light level of the compartment caused each time an object is placed on the far side of the surface over the light beam thereby reflecting light back into the compartment, and
(e) electrical indicating means connected to the light sensitive means adapted to register the number of times the object is accurately placed on the surface.

5. Apparatus for instructing in and testing the accuracy of the proper placement of objects on surfaces, comprising,
(a) a surface having light transmitting characteristics,
(b) a projector located above the surface for projecting light beams toward predetermined areas on the surface in a prearranged sequence,
(c) a compartment located beneath the surface having maintained therein an ambient light level,
(d) light sensitive means in the compartment adapted to be responsively actuated by an increase in the ambient light level in the compartment each time a projected light beam is transmitted through the surface, thereby indicating that an object has not been placed accurately on the surface between the projected light beam and the surface intercepting the beam, and
(e) electrical indicating means connected to the light sensitive means, said indicating means being adapted to register the number of times the object is inaccurately placed on the surface.

6. Apparatus for teaching and testing the accuracy of following a dance pattern, comprising,
(a) a floor having light transmitting characteristics,
(b) projecting means adapted to project light beams toward the floor on predetermined areas thereof in a prearranged sequence in timed relation to the music for a particular dance pattern,
(c) a compartment located beneath the floor having maintained therein an ambient light level,
(d) light sensitive means in the compartment adapted to be responsively actuated by a change in the ambient light level of the compartment caused each time the placing of a dancer's shoe on the floor deflects the projected light beam, and
(e) indicating means electrically connected to the light sensitive means, said indicating means being adapted to signal the number of times the projected light beam is followed.

7. Apparatus for teaching and testing the accuracy of a person following a dance pattern, comprising,
(a) a floor having a topside and an underside and being of light transmitting material,
(b) a compartment located beneath the floor having maintained therein an ambient light level,
(c) an image projector in the compartment for projecting light beams on the underside of the floor on predetermined areas thereof in a prearranged sequence in timed relation to the music for a particular dance pattern,
(d) photoelectric cell means in the compartment adapted to be responsively actuated by an increase in the ambient light level of the compartment caused each time the placing of a dancer's shoe on the topside of the floor simultaneously with the projected light beam reflects said light beam back to the compartment, and
(e) scoring means electrically connected to the photoelectric cell means for registering the number of times the dancer's shoe reflects said light beams.

8. Apparatus for teaching and testing the accuracy of the playing of a piano selection, comprising,
(a) a piano having keys of light transmitting material,
(b) a compartment in the piano having maintained therein an ambient light level,
(c) a projector in the compartment adapted to project light beams toward predetermined keys in a prearranged sequence in timed relation to a particular piano selection, which, if said keys were to be depressed in the same sequence as the light beams projected thereon would result in the proper playing of the piano selection,
(d) light sensitive means in the compartment adapted to be responsively actuated by an increase in the ambient light level of the compartment caused each time the placing of a player's fingers on the keys reflects the projected light beam, and
(e) indicating means electrically connected to the light sensitive means, said indicating means being adapted to register the number of times the projected beam is reflected.

9. Apparatus for instructing and testing the proper placement of objects with respect to a surface in accordance with a predetermined standard, comprising,
(a) a surface having ray transmitting characteristics,
(b) projecting means for projecting a beam of energizing rays toward said surface on a predetermined area thereof,
(c) ray sensitive means responsive to changes in the direction of the projected beam of rays caused by deflection of said rays each time an object is placed on the surface in accordance with a predetermined standard, and
(d) indicating means electrically connected to the ray sensitive means registering the occurrence of said responsive actuation of said ray sensitive means.

10. Apparatus for instructing and testing the proper placement of objects with respect to a surface in accordance with a predetermined standard, comprising,
(a) a surface being capable of transmitting light and a selected ray therethrough,
(b) first projecting means for projecting a light image on the surface, said image having a plurality of bright areas, one of said bright areas being preselected in accordance with a predetermined standard,
(c) second projecting means for projecting a beam of invisible energizing rays toward said surface on the preselected bright area thereof,
(d) means coordinating the first and second projecting means,
(e) ray sensitive means responsive to changes in the direction of the projected selected invisible beam of rays caused by deflection of said rays each time an object is placed on the preselected bright area of the surface simultaneously with the projection thereon of the invisible beam of rays, and
(f) indicating means electrically connected to the ray sensitive means registering the occurrence of said responsive actuation of said ray sensitive means.

11. Apparatus for instructing and testing the proper placement of objects with respect to a surface in accordance with a predetermined standard, comprising,
(a) a compartment having maintained therein an ambient light threshold,
(b) a first surface forming at least a portion of the compartment, said surface having light transmitting characteristics, projecting means in the compartment for projecting a light image on the first surface, said image having a plurality of areas each of which is brightened in a predetermined sequential arrangement, one of said areas being preselected in accordance with a predetermined standard,
(c) a second surface in the compartment having light reflecting characteristics,
(d) said projecting means being adapted to project an additional light beam toward said second surface simultaneously with the projection toward the preselected brightened area on said first surface,
(e) light sensitive means in the compartment responsive to an increase of the ambient light threshold in the compartment of an intensity of more than a predetermined minimum when an object is placed on the preselected area simultaneously with the brightening thereof, (f) said predetermined minimum intensity being greater than the increase of ambient light resulting solely from a reflection of light from said second surface and said predetermined minimum intensity being greater than the reflection of light resulting solely from an object placed over a bright area, and (g) indicating means electrically connected to the light sensitive means registering the occurrence of said responsive actuation of said means.

References Cited by the Examiner
UNITED STATES PATENTS

| | | | |
|---|---|---|---|
| Re. 23,030 | 8/1848 | Holt | 35—9 |
| 1,324,276 | 12/1919 | Schantz | 84—477 |
| 1,960,097 | 5/1934 | Barnard et al. | 250—228 X |
| 2,605,557 | 8/1952 | Van Deventer | 35—29.3 |
| 2,727,683 | 12/1955 | Allen et al. | 250—209 X |
| 2,897,712 | 8/1959 | Merchant | 84—478 |

EUGENE R. CAPOZIO, *Primary Examiner.*

WALTER STOLWEIN, LAWRENCE CHARLES, CHARLES A. WILLMUTH, *Examiners.*